United States Patent
Flickinger et al.

(10) Patent No.: US 10,577,024 B2
(45) Date of Patent: Mar. 3, 2020

(54) BRACKET AND MOUNTING SYSTEM FOR USE IN SUPPORTING A MODULE WITHIN A VEHICLE

(71) Applicant: Honda Motor Co., Ltd., Tokyo (JP)

(72) Inventors: Evan D. Flickinger, Marysville, OH (US); Nobuteru Fujii, Tochigi (JP); Akihiko Koike, Dublin, OH (US); Michael D. Lucas, Plain City, OH (US)

(73) Assignee: Honda Motor Co., Ltd., Tokyo (JP)

( * ) Notice: Subject to any disclaimer, the term of this patent is extended or adjusted under 35 U.S.C. 154(b) by 87 days.

(21) Appl. No.: 16/017,094

(22) Filed: Jun. 25, 2018

(65) Prior Publication Data

US 2019/0389513 A1    Dec. 26, 2019

(51) Int. Cl.
*B62D 25/08* (2006.01)
*F16F 1/373* (2006.01)
*F16M 13/02* (2006.01)

(52) U.S. Cl.
CPC .......... *B62D 25/088* (2013.01); *F16F 1/3732* (2013.01); *B60G 2204/41* (2013.01); *F16M 13/02* (2013.01)

(58) Field of Classification Search
CPC . B62D 25/088; F16F 1/3732; B60G 2204/41; F16M 13/02
See application file for complete search history.

(56) References Cited

U.S. PATENT DOCUMENTS

| 4,391,436 | A | | 7/1983 | Fishbaugh | |
|---|---|---|---|---|---|
| 5,375,870 | A | * | 12/1994 | Smith | B60G 11/16 180/297 |
| 5,743,509 | A | | 4/1998 | Kanda et al. | |
| 6,098,949 | A | | 8/2000 | Robinson | |
| 6,491,279 | B1 | | 12/2002 | Iwano | |
| 6,746,089 | B2 | | 6/2004 | Nakazawa | |
| 6,932,439 | B2 | | 8/2005 | Nakazawa | |
| 8,235,350 | B2 | | 8/2012 | Tetsuda et al. | |
| 8,864,246 | B2 | | 10/2014 | Kodama et al. | |
| 9,115,846 | B2 | | 8/2015 | Maier et al. | |
| 9,156,501 | B2 | * | 10/2015 | Mildner | B62D 21/11 |
| 2003/0015915 | A1 | | 1/2003 | Ruffer et al. | |
| 2016/0244103 | A1 | * | 8/2016 | Amemiya | B62D 21/00 |
| 2016/0304130 | A1 | * | 10/2016 | Shin | B60G 15/068 |
| 2019/0009830 | A1 | * | 1/2019 | Kondo | B62D 25/088 |

FOREIGN PATENT DOCUMENTS

| DE | 10340820 A1 | 3/2005 | |
|---|---|---|---|
| DE | 102010019363 A1 | 11/2011 | |
| EP | 0413158 A1 * | 2/1991 | ............. B60G 3/202 |

(Continued)

*Primary Examiner* — Lori L Lyjak
(74) *Attorney, Agent, or Firm* — Armstrong Teasdale LLP (57) ABSTRACT

A bracket for use in supporting a module within a vehicle. The bracket includes a first end, a second end, and a bracket body extending between the first end and the second end. The bracket body includes at least one attachment point defined at each of the first end and the second end, a first side that defines a mounting surface, and a second side opposite the first side. The bracket body also includes a reinforced side wall that extends about the at least one attachment point. The reinforced side wall is configured to define a bushing receptacle on both the first side and the second side of the bracket body.

20 Claims, 7 Drawing Sheets

(56) References Cited

FOREIGN PATENT DOCUMENTS

| EP | 0940323 | A1 | * | 9/1999 | ............... | B60G 9/00 |
|----|---------|----|---|--------|-----------------|-----------|
| EP | 1643154 | B1 |   | 3/2007 | | |
| WO | 2006091632 | A3 |   | 10/2006 | | |
| WO | 2010137585 | A1 |   | 12/2010 | | |
| WO | 2013077159 | A1 |   | 5/2013 | | |

* cited by examiner

BRACKET AND MOUNTING SYSTEM FOR USE IN SUPPORTING A MODULE WITHIN A VEHICLE

BACKGROUND

The field of the present disclosure relates generally to mounting systems for use in vehicle engine bays and, more specifically, to a lightweight mounting system with enhanced noise, vibration, and harshness (NVH) performance.

Many modern motor vehicles include one or more electronic or hydraulic modules coupled within the engine bay of the vehicle. For example, at least some vehicles include a module that executes vehicle stability assist (VSA) functionality. VSA functionality includes computerized safety features such as anti-lock braking, traction control, brake assist, and/or electronic stability control. At least some known electronic or hydraulic modules are mounted within the vehicle using a bracket system fabricated from metallic material. For example, the bracket system may include a primary bracket attached to a frame of the vehicle, and a secondary bracket that couples the module to the primary bracket. The bracket system may also include an elastomeric damper inserted within an opening defined in the primary bracket. The elastomeric damper functions as a buffer between the primary bracket and the secondary bracket. However, the NVH performance of the damper is generally dependent on the thickness of the primary bracket, and the ability of the bracket to exert a compressive force on the damper.

BRIEF DESCRIPTION

In one aspect, a bracket for use in supporting a module within a vehicle is provided. The bracket includes a first end, a second end, and a bracket body extending between the first end and the second end. The bracket body includes at least one attachment point defined at each of the first end and the second end, a first side that defines a mounting surface, and a second side opposite the first side. The bracket body also includes a reinforced side wall that extends about the at least one attachment point. The reinforced side wall is configured to define a bushing receptacle on both the first side and the second side of the bracket body.

In another aspect, a vehicle is provided. The vehicle includes a frame member and a bracket. The bracket includes a first end, a second end, and a bracket body extending between the first end and the second end. The bracket body includes at least one attachment point defined at each of the first end and the second end, a first side that defines a mounting surface, and a second side opposite the first side. The bracket body also includes a reinforced side wall that extends about the at least one attachment point. The reinforced side wall is configured to define a bushing receptacle on both the first side and the second side of the bracket body. The vehicle also includes a module supported on the mounting surface.

In yet another aspect, a mounting system for use in supporting a module within a vehicle is provided. The mounting system includes a bracket and at least one pair of elastomeric bushings. The bracket includes a first end, a second end, and a bracket body extending between the first end and the second end. The bracket body includes at least one attachment point defined at each of the first end and the second end, a first side that defines a mounting surface, and a second side opposite the first side. The bracket body also includes a reinforced side wall that extends about the at least one attachment point. The reinforced side wall is configured to define a bushing receptacle on both the first side and the second side of the bracket body. The pair of elastomeric bushings includes a first elastomeric bushing and a second elastomeric bushing. The first elastomeric bushing is positioned within the bushing receptacle on the first side of the bracket body, and the second elastomeric bushing is positioned within the bushing receptacle on the second side of the bracket body.

DETAILED DESCRIPTION

The embodiments described herein relate generally to a lightweight mounting system with enhanced noise, vibration, and harshness (NVH) performance. More specifically, the mounting system described herein includes a bracket fabricated from non-metallic material, which facilitates reducing the weight of the bracket as compared to other known brackets fabricated from metallic material. Fabricating the bracket from non-metallic material also enables the bracket to be designed with features that facilitate enhancing the NVH performance of the mounting system. For example, the bracket described herein includes a first end and a second end that each include an attachment point that enable attachment of the bracket to a vehicle frame. The bracket is formed with a reinforced side wall that extends about the attachment points such that a bushing receptacle is defined on both sides of the bracket body. In the exemplary embodiment, an elastomeric bushing is positioned within each bushing receptacle, and the reinforced side wall is oriented to induce a compressive force to each bushing. As such, the NVH performance of the mounting system is improved. In addition, the bracket described herein enables a specialized collar to be incorporated therein. A vehicle module may be coupled to the collar, and the collar is designed to resist a rotational moment when installing the vehicle module on the bracket, and when installing other components on the vehicle module, thereby improving the overall performance and reliability of the mounting system.

Figure 1:
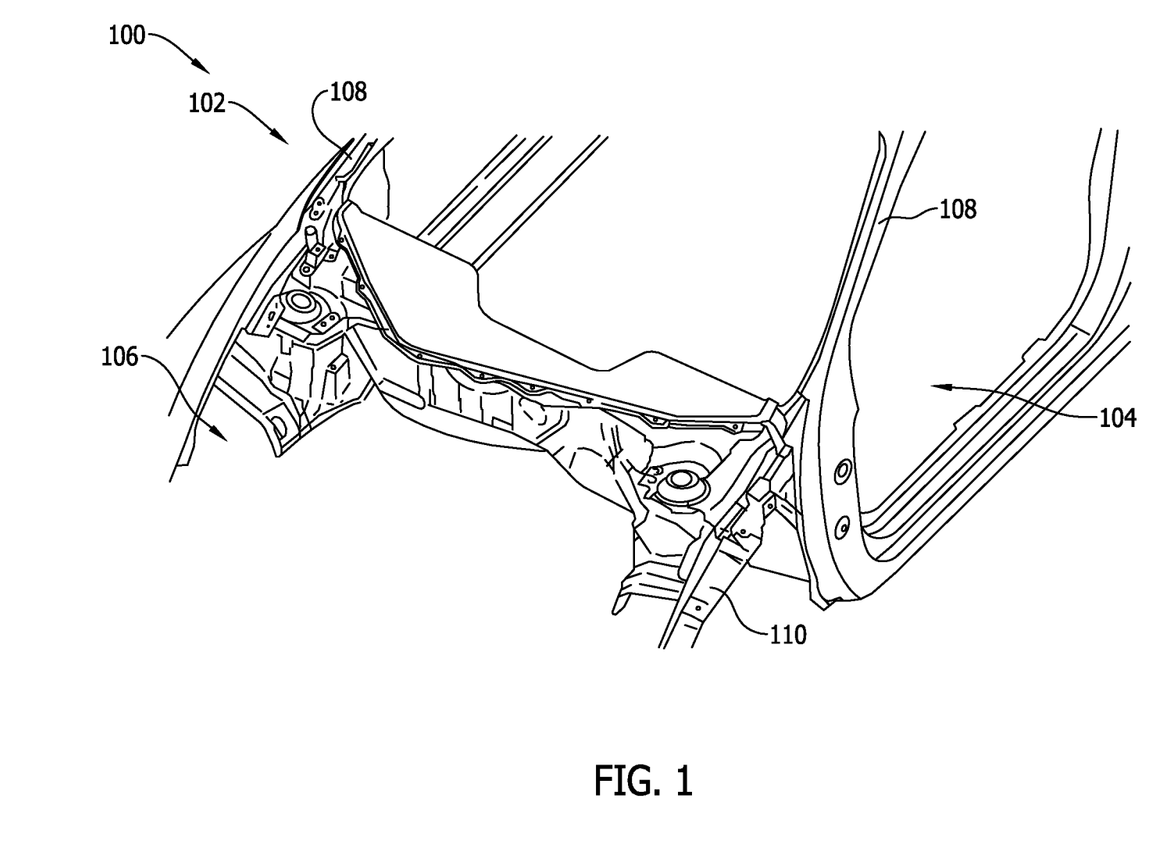
FIG. 1 is a partial plan view of an exemplary vehicle.

FIG. 1 is a partial plan view of an exemplary vehicle 100. In the exemplary embodiment, vehicle 100 includes a frame body 102, and a passenger cabin 104 and an engine bay 106 formed from frame body 102. For example, frame body 102 includes a pair of front pillars 108 that define passenger cabin 104, and frame body 102 includes at least one frame member 110 that defines engine bay 106. Engine bay 106 is sized to house a plurality of mechanical, electrical, and/or hydraulic components therein.

Figure 2:
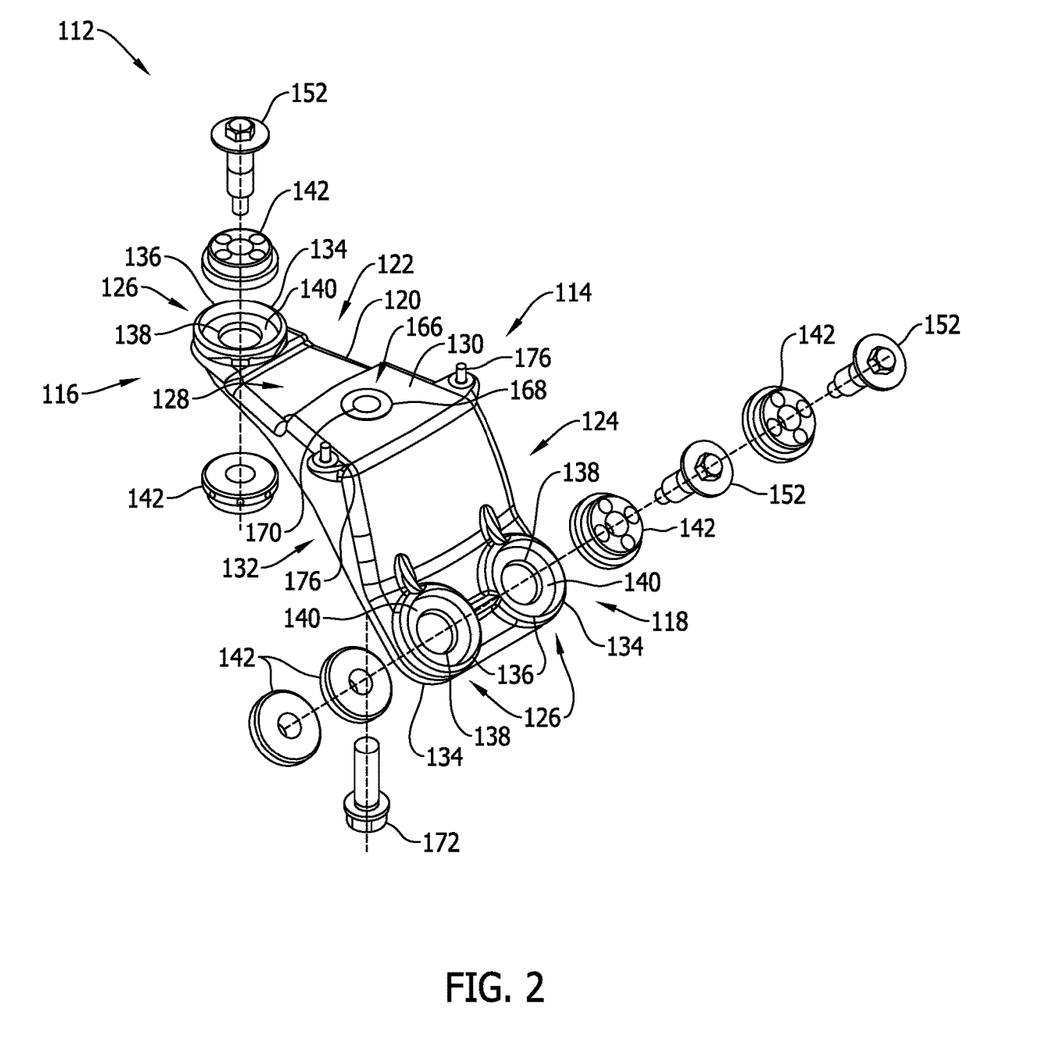
FIG. 2 is an exploded perspective view of an exemplary mounting system that may be used with the vehicle shown in FIG. 1.

FIG. 2 is an exploded perspective view of an exemplary mounting system 112 for use in vehicle 100 (shown in FIG. 1). In the exemplary embodiment, mounting system 112 includes a bracket 114 having a first end 116 and an opposite second end 118. Bracket 114 further includes a bracket body 120 extending between first end 116 and second end 118. Bracket body 120 is fabricated from non-metallic material such as, but not limited to, a plastic material or a carbon fiber reinforced polymer (CFRP) material. Alternatively, bracket body 120 may be fabricated from any material that enables mounting system 112 to function as described herein.

In addition, bracket body 120 has a first section 122 extending from first end 116 towards second end 118, and a second section 124 extending from second end 118 towards first end 116. In one embodiment, first section 122 and second section 124 are oriented obliquely relative to each other to enable bracket 114 to couple to frame member 110 (shown in FIG. 1), for example, at different elevational locations within engine bay 106 (shown in FIG. 1). Alternatively, bracket body 120 may have any other body configuration that enables mounting system 112 to function as described herein.

Bracket body 120 also includes at least one attachment point 126 defined at each of first end 116 and second end 118. Bracket body 120 has a first side 128 that that defines a mounting surface 130, and an opposite second side 132 opposite first side 128. Bracket body 120 includes a reinforced side wall 134 that extends about the at least one attachment point 126 such that a bushing receptacle 136 is defined on both first side 128 and second side 132 of bracket body 120. Moreover, each attachment point 126 includes an attachment opening 138 and a partition 140 that extends about attachment opening 138. As will be described in more detail below, attachment opening 138 provides access between first side 128 and second side 132 of bracket body 120 such that a fastener is insertable therethrough when assembling mounting system 112. In addition, each bushing receptacle 136 is circumscribed by reinforced side wall 134 and partition 140.

Figure 6:
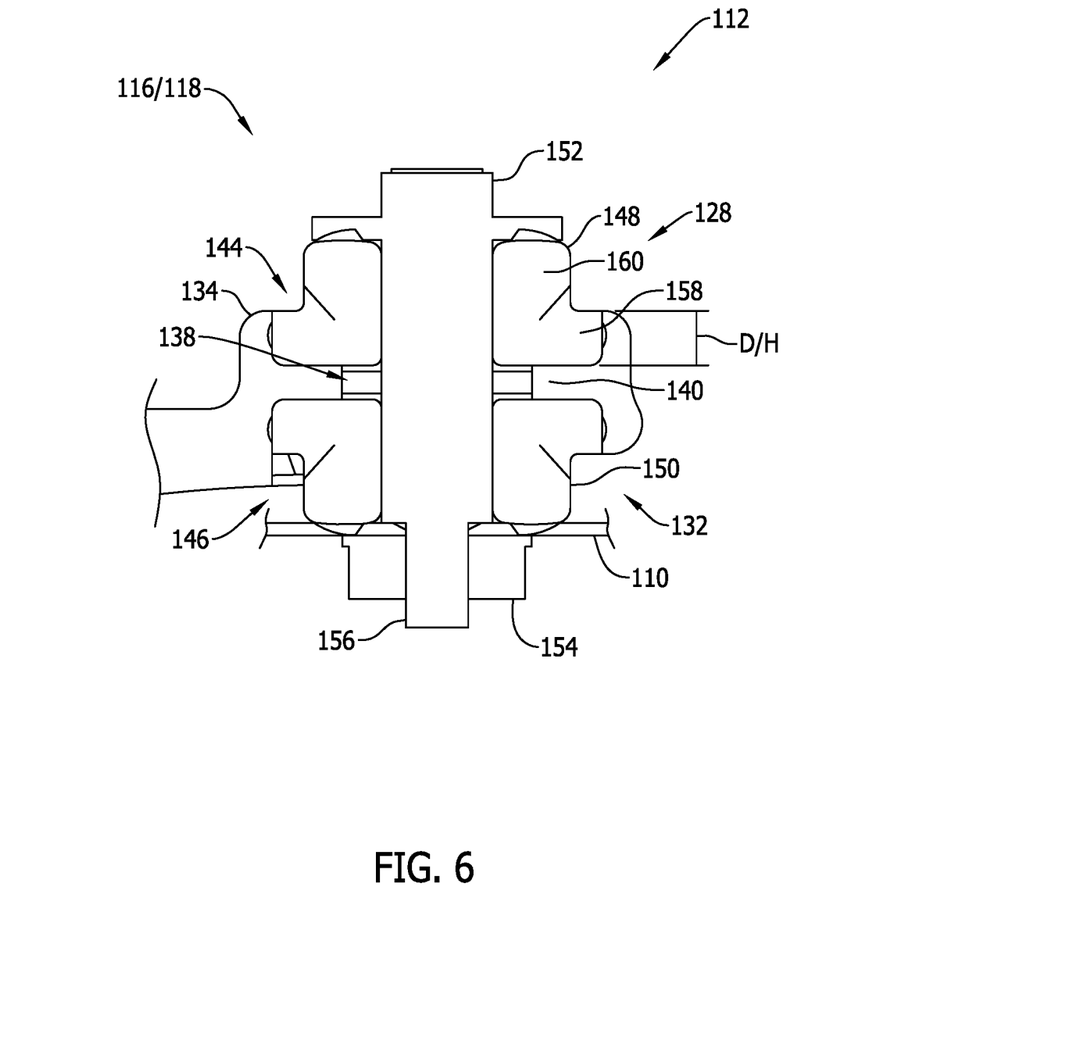
FIG. 6 is a sectional view of an exemplary attachment point that may be used to attach the mounting system to the vehicle.

Each bushing receptacle 136 is sized to receive an elastomeric bushing 142 therein when mounting system 112 is assembled. For example, as shown in FIG. 6, a first bushing receptacle 144 is defined on first side 128 of bracket body 120, and a second bushing receptacle 146 is defined on second side 132 of bracket body 120. A first elastomeric bushing 148 is positioned within first bushing receptacle 144, and a second elastomeric bushing 150 is positioned within second bushing receptacle 146. Mounting system 112 further includes a shoulder bolt 152 that extends through first elastomeric bushing 148, attachment opening 138, and second elastomeric bushing 150 for coupling bracket body 120 to frame member 110. Frame member 110 is coupled to second elastomeric bushing 150. A nut 154 is then engaged with a protruding portion 156 of shoulder bolt 152 to couple bracket body 120 to frame member 110.

Figure 7:
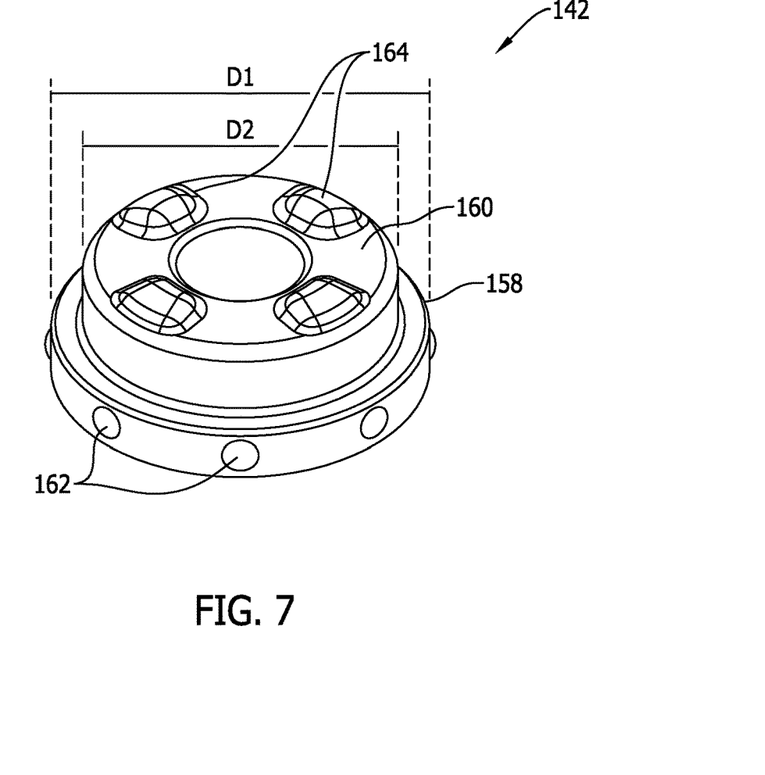
FIG. 7 is a perspective view of an exemplary elastomeric bushing that may be used in the mounting system shown in FIG. 2.

Referring now to FIGS. 6 and 7, an exemplary elastomeric bushing 142 is illustrated therein. In the exemplary embodiment, elastomeric bushing 142 includes a first portion 158 having a first diameter D1, and a second portion 160 having a second diameter D2 less than first diameter D1. First portion 158 has a plurality of radial nubs 162 formed thereon that are spaced from each other about a circumference of elastomeric bushing 142. The plurality of radial nubs 162 facilitate retaining elastomeric bushing 142 against reinforced side wall 134 (i.e., to create an interference fit) when elastomeric bushing 142 is positioned within either first bushing receptacle 144 and/or second bushing receptacle 146. Second portion 160 includes a plurality of axial bumps 164 formed thereon that are also spaced from each other about the circumference of elastomeric bushing 142. The plurality of axial bumps 164 facilitate retaining elastomeric bushing 142 in compression within either first bushing receptacle 144 and/or second bushing receptacle 146, with tolerance, when nut 154 is engaged with shoulder bolt 152. In other words, axial bumps 164 increase the height of elastomeric bushing 142 for the purpose of facilitating compression of elastomeric bushing 142 in the event there is a dimensional variance between the length of shoulder bolt 152 and the combined height of a pair of elastomeric bushings 142 and any additional structures coupled to elastomeric bushings 142.

Elastomeric bushing 142 may be fabricated from any material that enables mounting system 112 to function as described herein. An example elastomeric material includes, but is not limited to, a rubber material.

Referring again to FIG. 6, the assembly and orientation of an elastomeric bushing within a bushing receptacle is described in greater detail in the context of first elastomeric bushing 148 and first bushing receptacle 144. However, the description is also applicable to second elastomeric bushing 150 and second bushing receptacle 146. In the exemplary embodiment, when mounting system 112 is assembled, first elastomeric bushing 148 is oriented such that first portion 158 is positioned within first bushing receptacle 144, and such that second portion 160 protrudes from first bushing receptacle 144. In addition, first bushing receptacle 144 has a depth D approximately equal to an axial height H of first portion 158. As such, reinforced side wall 134 is capable of retaining first portion 158 in compression, which facilitates enhancing the NVH performance of mounting system 112.

Figure 5:
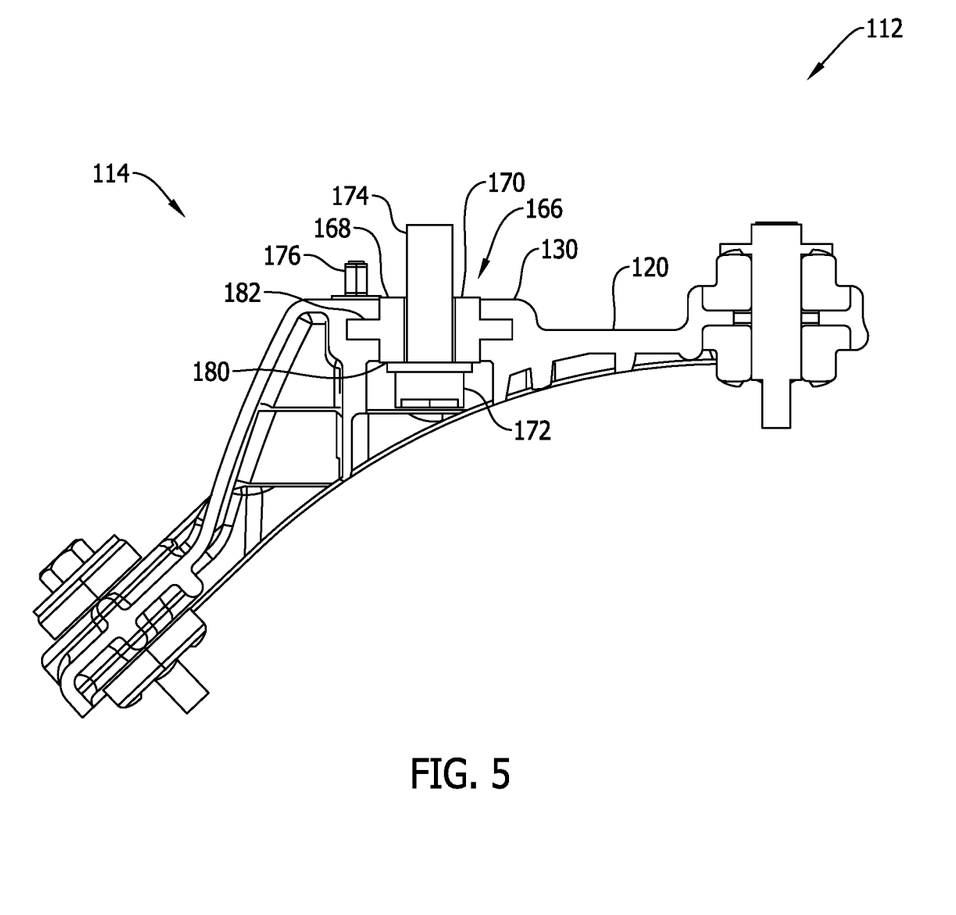
FIG. 5 is a cross-sectional view of the mounting system shown in FIG. 4, as taken along Line 5-5.

Referring to FIGS. 2 and 5, bracket body 120 further includes a through hole 166 extending therethrough such that a support opening 168 is defined at mounting surface 130. Bracket 114 further includes a gear tooth collar 170 positioned within through hole 166. A fastening bolt 172 is sized for insertion within through hole 166, and is sized to extend through gear tooth collar 170 such that a protruding portion 174 of bolt 172 extends from mounting surface 130 and protrudes from support opening 168. In addition, bracket body 120 includes at least one post 176 extending from mounting surface 130 in a direction substantially perpendicular relative to mounting surface 130.

In the exemplary embodiment, fastening bolt 172 and post 176 couple to a module 178 (shown in FIG. 3) supported on mounting surface 130 to facilitate retaining module 178 in a fixed position on mounting surface 130. More specifically, in one embodiment, protruding portion 174 of fastening bolt 172 is sized and oriented to threadably engage module 178 for retaining module 178 on mounting surface 130. In addition, post 176 is positioned a distance from support opening 168 on mounting surface 130 and, like protruding portion 174, extends substantially perpendicularly relative to mounting surface 130. As such, when engaged with module 178, post 176 facilitates inhibiting rotational movement of module 178 on mounting surface 130.

Figure 8:
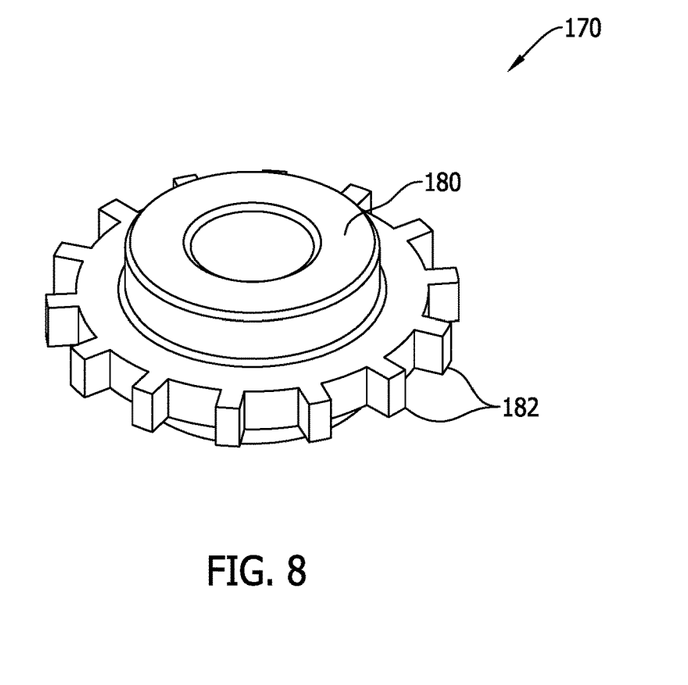
FIG. 8 is a perspective view of an exemplary gear tooth collar that may be used in the mounting system shown in FIG. 2.

FIG. 8 is a perspective view of an exemplary gear tooth collar 170. In the exemplary embodiment, gear tooth collar 170 has a central body 180 and a plurality of radial gear teeth 182 extending from central body 180. Gear tooth collar 170 may be fabricated from any material that enables mounting system 112 (shown in FIG. 2) to function as described herein. An example material includes, but is not limited to, a metallic material.

As will be described in more detail below, gear tooth collar 170 facilitates counteracting a rotational moment about more than one axis when installing module 178 on bracket 114, and when installing brake lines 184 onto module 178 (all shown in FIG. 3), for example. More specifically, referring again to FIG. 5, gear tooth collar 170 is positioned within through hole 166, and bracket body 120 is formed about, and at least partially encapsulates, gear tooth collar 170. For example, in one embodiment, bracket body 120 is fabricated from a thermoplastic material in a mold, and gear tooth collar 170 is positioned within the mold before the thermoplastic material is injected therein. As such, at least a portion of bracket body 120 fills the space between adjacent radial gear teeth 182 such that gear tooth collar 170 is rotationally fixed within bracket body 120. Thus, radial gear teeth 182 facilitate counteracting the rotational moment induced when tightening fastening bolt 172.

Figure 3:
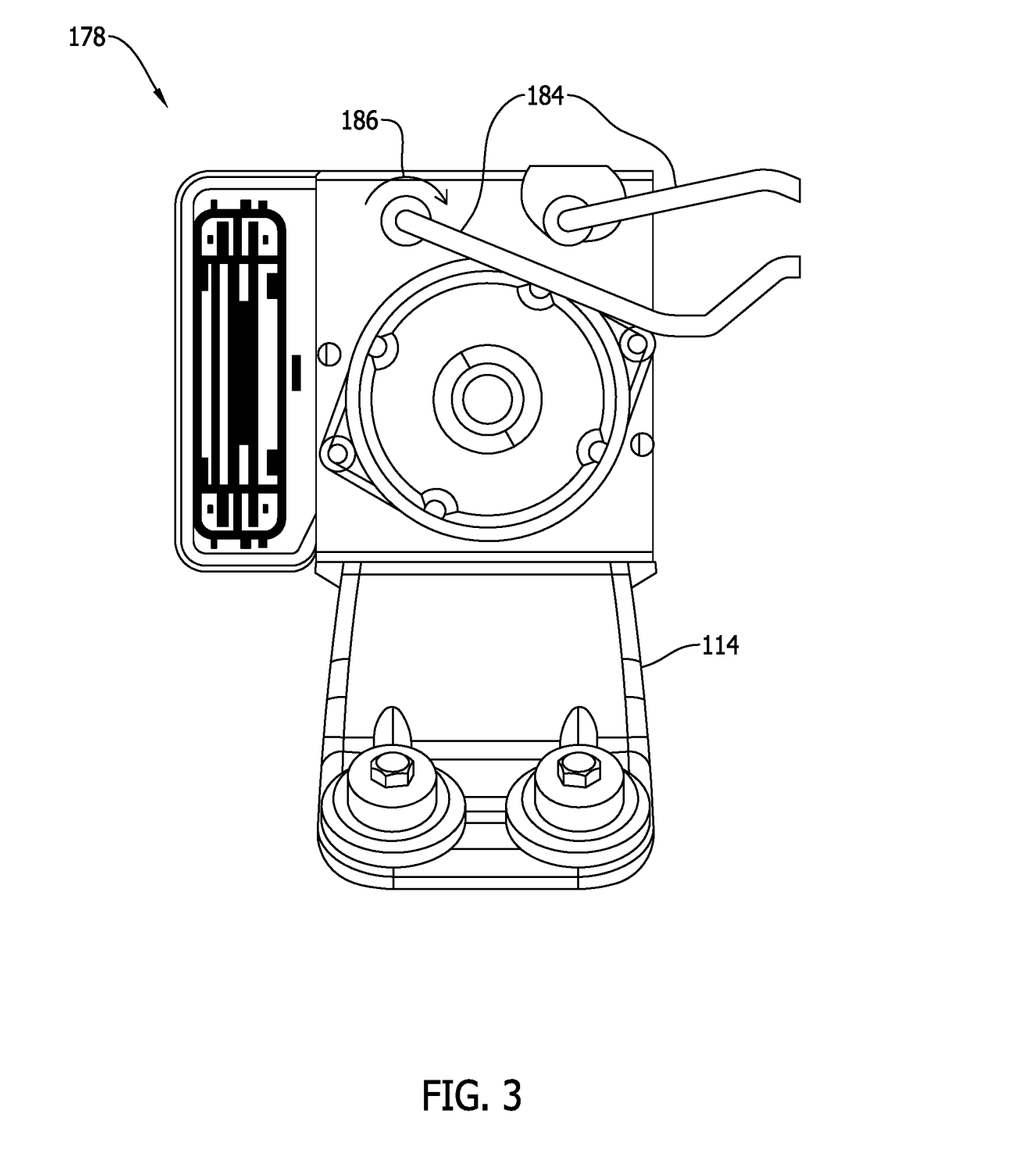
FIG. 3 is an assembled front view of the mounting system shown in FIG. 2 and including a module mounted thereon.

In addition, referring to FIG. 3, module 178 is typically coupled to bracket 114 and then additional assembly steps are executed. For example, in one embodiment, module 178 is a vehicle stability assist (VSA) module, which electronically controls braking of vehicle 100 under certain predetermined conditions. Thus, module 178 has a plurality of brake lines 184 coupled thereto, which are installed by applying rotational torque 186 to brake lines 184. As noted above, radial gear teeth 182 extend from central body 180, and radial gear teeth 182 are enclosed within bracket body 120 (shown in FIG. 5). As such, radial gear teeth 182 and bracket body 120 interact and are oriented to counteract rotational torque 186 when brake lines 184 are tightened.

Figure 4:
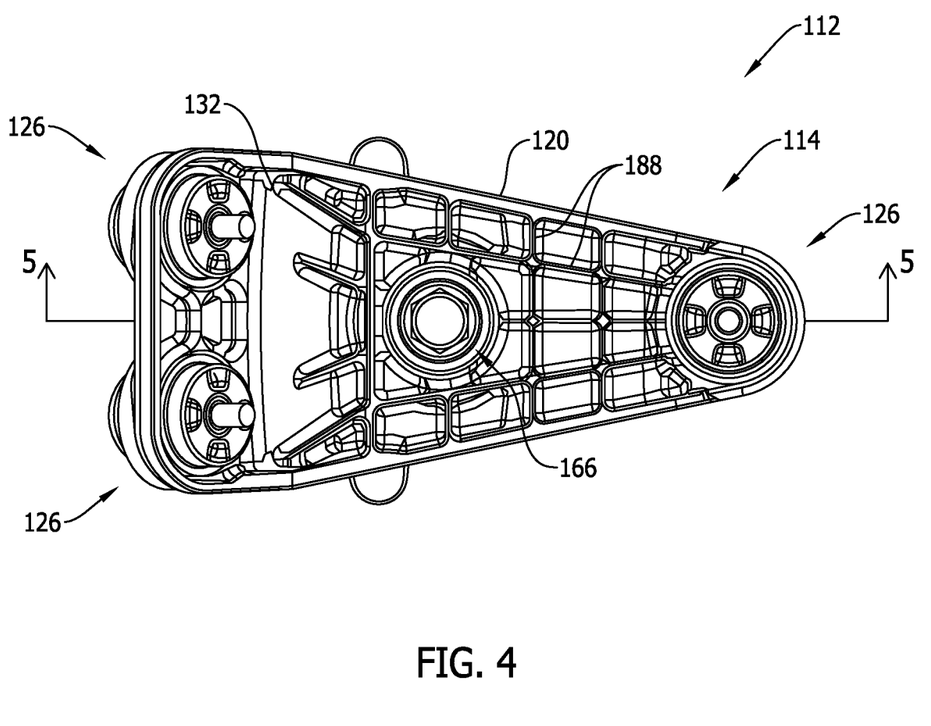
FIG. 4 is a bottom view of the assembled mounting system shown in FIG. 3.

FIG. 4 is a bottom view of mounting system 112. In the exemplary embodiment, bracket body 120 further includes at least one stiffening rib 188 formed on second side 132 of bracket body 120. As noted above, bracket body 120 is fabricated from non-metallic material. As such, stiffening rib 188 is adapted to increase the rigidity and durability of bracket 114. One or more stiffening ribs 188 may be formed on second side 132 of bracket body 120. When more than one stiffening rib 188 is formed thereon, the plurality of stiffening ribs 188 may be arranged in any manner than enables bracket body 120 to function as described herein. In the exemplary embodiment, stiffening ribs 188 are arranged in a grid-like pattern. Moreover, stiffening ribs 188 are arranged to facilitate reinforcing high stress areas of bracket body 120, such as locations at or around attachment points 126 and through hole 166. More specifically, in one embodiment, stiffening ribs 188 converge at attachment points 126 and through hole 166 to provide additional reinforcement thereto.

This written description uses examples to disclose various embodiments, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A bracket for use in supporting a module, said bracket comprising:
   a first end;
   a second end;
   a bracket body extending between said first end and said second end, said bracket body comprising:
      at least one attachment point defined at each of said first end and said second end;
      a first side that defines a mounting surface, and a second side opposite said first side; and
      a reinforced side wall extending about said at least one attachment point, said reinforced side wall configured to define a bushing receptacle on both said first side and said second side of said bracket body.

2. The bracket in accordance with claim 1, wherein said at least one attachment point is defined by an attachment opening and a partition extending about said attachment opening, said bushing receptacle defined by said reinforced side wall and said partition.

3. The bracket in accordance with claim 1, wherein said bracket body further comprises at least one stiffening rib formed on said second side of said bracket body.

4. The bracket in accordance with claim 1, wherein said bracket body further comprises a through hole extending therethrough such that a support opening is defined at said mounting surface.

5. The bracket in accordance with claim 4 further comprising a gear tooth collar, comprising a plurality of radial gear teeth, positioned within said through hole, wherein said bracket body is formed about said plurality of radial gear teeth such that said gear tooth collar is rotationally and axially fixed relative to said bracket body.

6. The bracket in accordance with claim 1, wherein said bracket body further comprises a first section extending from said first end towards said second end, and a second section extending from said second end towards said first end, said first section and said second section oriented obliquely relative to each other.

7. The bracket in accordance with claim 1, wherein said bracket body further comprises at least one post extending from said mounting surface in a direction substantially perpendicular relative to said mounting surface.

8. The bracket in accordance with claim 1, wherein said bracket body is manufactured from non-metallic material.

9. A vehicle comprising:
   a frame member; and
   a bracket comprising:
      a first end attached to said frame member;
      a second end attached to said frame member; and
      a bracket body extending between said first end and said second end, said bracket body comprising:
         at least one attachment point defined at each of said first end and said second end;
         a first side that defines a mounting surface, and a second side opposite said first side; and
         a reinforced side wall extending about said at least one attachment point, said reinforced side wall configured to define a bushing receptacle on both said first side and said second side of said bracket body; and
      a module supported on said mounting surface.

10. The vehicle in accordance with claim 9, wherein said bracket body further comprises a through hole extending therethrough such that a support opening is defined at said mounting surface.

11. The vehicle in accordance with claim 10 further comprising a first bolt that is sized to extend through said through hole and to protrude from said support opening, said first bolt configured to couple said module to said mounting surface.

12. The vehicle in accordance with claim 11 further comprising a gear tooth collar positioned within said through hole, wherein said first bolt is further configured to extend through said gear tooth collar.

13. The vehicle in accordance with claim 9 further comprising at least one pair of elastomeric bushings comprising a first elastomeric bushing and a second elastomeric bushing, said first elastomeric bushing positioned within said bushing receptacle on said first side of said bracket body, and said second elastomeric bushing positioned within said bushing receptacle on said second side of said bracket body.

14. The vehicle in accordance with claim 13 further comprising a second bolt configured to extend through said at least one pair of elastomeric bushings, wherein said second bolt is further configured to couple said bracket to said frame member.

15. The vehicle in accordance with claim 9, wherein said module is a vehicle stability assist module.

16. A mounting system for use in supporting a module, said mounting system comprising:
   a bracket comprising:
      a first end;
      a second end; and
      a bracket body extending between said first end and said second end, said bracket body comprising:
         at least one attachment point defined at each of said first end and said second end;
         a first side that defines a mounting surface, and a second side opposite said first side; and
         a reinforced side wall extending about said at least one attachment point, said reinforced side wall configured to define a bushing receptacle on both said first side and said second side of said bracket body; and
   at least one pair of elastomeric bushings comprising a first elastomeric bushing and a second elastomeric bushing, said first elastomeric bushing positioned within said bushing receptacle on said first side of said bracket body, and said second elastomeric bushing positioned within said bushing receptacle on said second side of said bracket body.

17. The mounting system in accordance with claim 16, wherein each elastomeric bushing in said at least one pair comprises a first portion having a first diameter, and a second portion having a second diameter less than the first diameter.

18. The mounting system in accordance with claim 17, wherein said each elastomeric bushing is oriented such that said first portion is positioned within said bushing receptacle, and such that said second portion is configured to protrude from said bushing receptacle.

19. The mounting system in accordance with claim 18, wherein said first portion is sized for positioning within said bushing receptacle with an interference fit.

20. The mounting system in accordance with claim 17, wherein said bushing receptacle has a depth substantially equal to an axial height of said first portion.

* * * * *